Patented July 17, 1923.

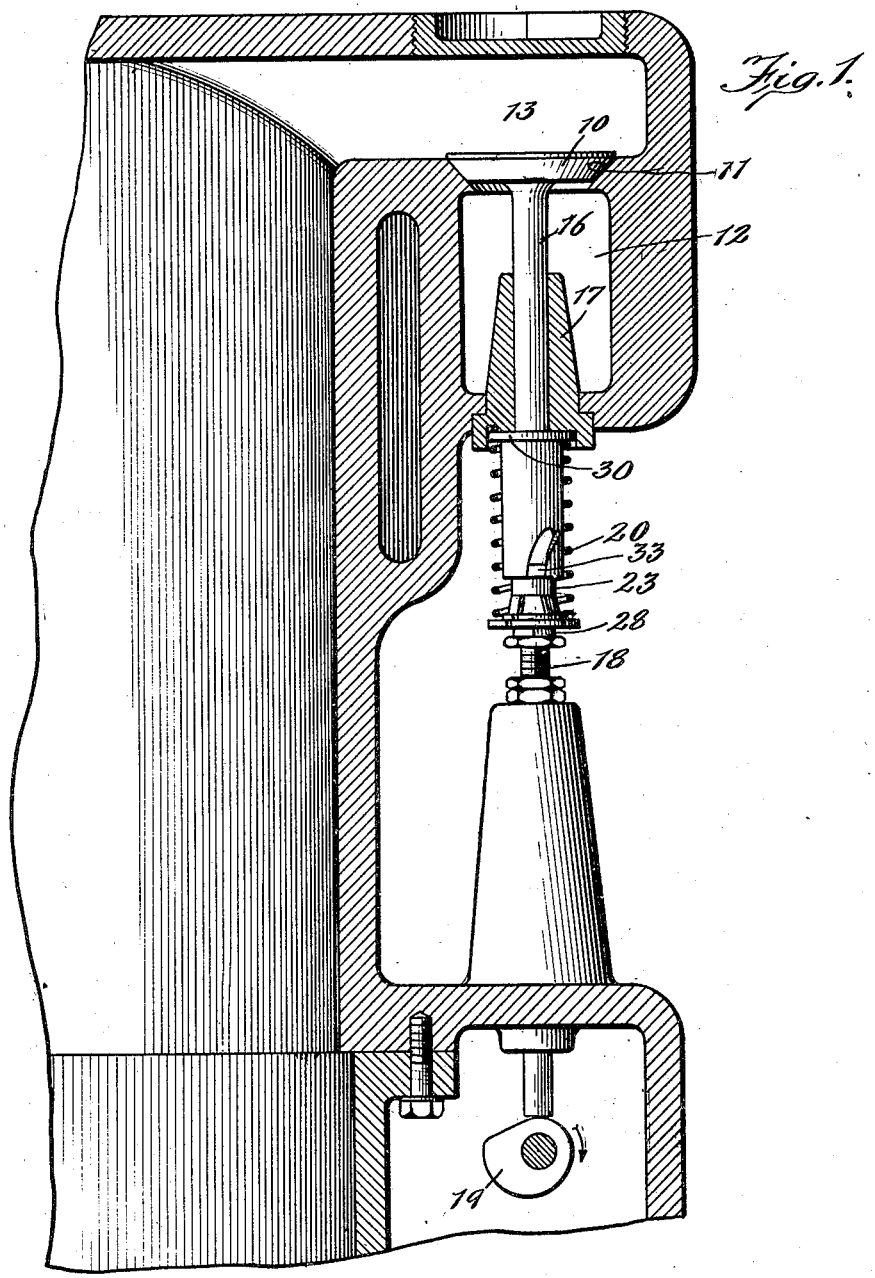

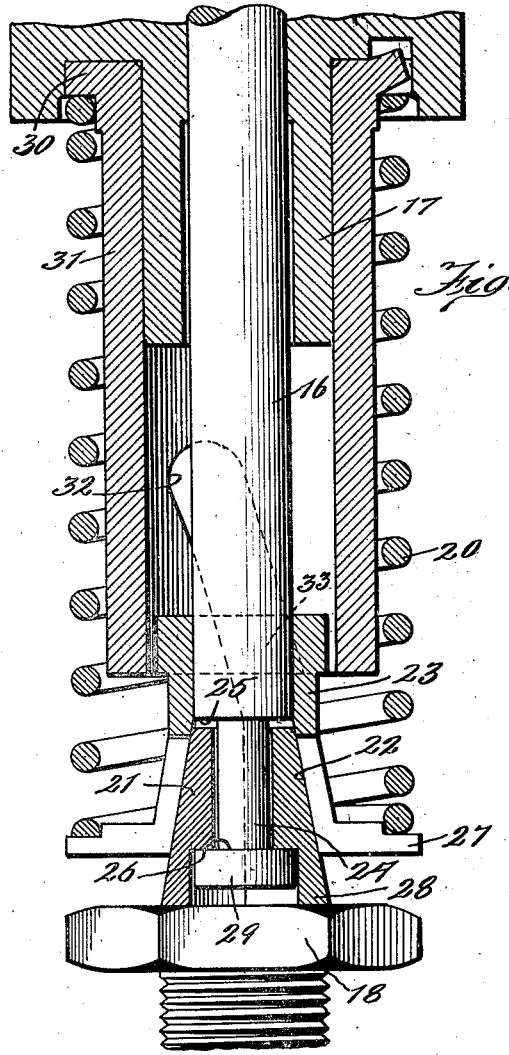
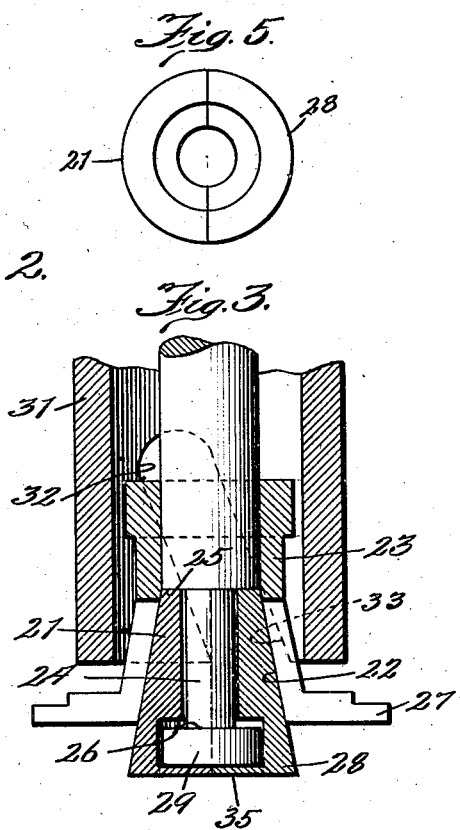
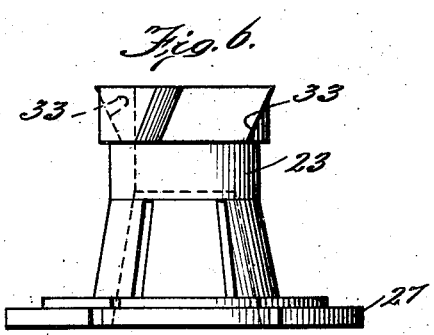
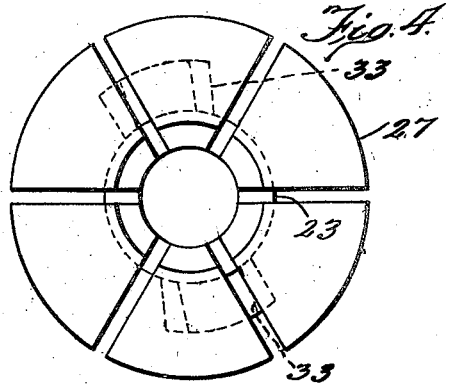

1,462,160

UNITED STATES PATENT OFFICE.

MARCUS O. ANTHONY, OF CLEVELAND, OHIO, ASSIGNOR TO CONTINENTAL ENGINEERING CORPORATION, OF OMAHA, NEBRASKA, A CORPORATION OF NEBRASKA.

ROTARY VALVE.

Application filed October 9, 1922. Serial No. 593,244.

*To all whom it may concern:*

Be it known that I, MARCUS O. ANTHONY, a citizen of the United States, residing at Cleveland, in the county of Cuyahoga and State of Ohio, have invented certain new and useful Improvements in Rotary Valves, of which the following is a specification.

This invention relates to rotators for valves of internal combustion engines, and it has for its general object providing suitable rotators for rotating the puppet valves of such an engine. A particular object is to provide such a device which is very simple, inexpensive and dependable, and one which may be readily applied to many types of internal combustion engines, particularly those which are used on automobiles and other vehicles.

Of the accompanying drawings, Fig. 1 is an elevation of a valve rotator mounted on a valve stem which embodies the features of my invention; Fig. 2 is an enlarged longitudinal sectional elevation of the rotator; Fig. 3 is a corresponding but partial view of a slightly modified rotator when the valve is open; Fig. 4 is an end view of the rotator; Fig. 5 is a lower end view of a split collar used with the rotator; and Fig. 6 is an elevation of the rotating member of the rotator.

The rotator which I have provided, and described in this instance, is applicable to the puppet valve 10 of an internal combustion engine. When closed the valve is seated on the seat 11 between the gas chambers 12 and 13 of the engine. The valve stem 16 passes through an ordinary stem guide 17, and the stem is operated by any suitable tappet 18. The tappet may be operated in any suitable manner such as by means of the cam 19; and a spring 20 is adapted to yieldingly hold the valve on its seat. I prefer to have the can so formed as to operate the valve in one direction at a greater speed than in the other direction.

The rotator which I have invented and described herein is a modification of the rotator which I described in my copending patent application No. 582,901; and reference may be made to that application for certain details which are not particularly applicable to the rotator described herein or are not claimed in this application.

The rotator described herein is adapted to give a slight rotating movement to the valve upon each operation thereof; but the rotation may be in one direction or the other, as desired, and may be upon opening or closing the valve, depending upon the particular adjustment and arrangement of the various parts. The valve is so arranged as to be pressed downwardly by the spring 20 when the valve is closed, but so that the stem is released from this pressure at substantially all times when the valve is opened. This being so, the valve may be said to be floating when open, and hence it is then free to rotate without overcoming in any way the retarding effect of the spring. For this reason it becomes unnecessary with this rotator to provide a ball-bearing to reduce the friction opposing the rotation.

The removal of the spring pressure from the valve stem as the valve opens is produced in the following manner: A split collar 21 is provided for holding the parts in their assembled positions on the valve stem normally, as is common, and as is fully set forth in my copending application. This split collar is positioned within a conical bore 22 of the rotating member 23, and the collar encircles the reduced portion 24 of the stem 16 and it is positioned between the shoulders 25 and 26 of the stem. The member 23, which also encircles the stem has a slotted annular flange 27 which forms the bearing for the lower end of the spring 20, so that when the valve is closed the spring, forcing downwardly the member 23 and hence the split collar 21, also forces downwardly the valve stem 16.

The lower end 28 of the split collar, however, projects below the end 29 of the stem; and hence as the tappet 18 is forced upwardly, it presses against the end of the split collar, and this in turn forces upwardly the member 23 and the flange 27 supporting the spring and thus removes the spring pressure from the stem. Then the upper end of the collar 21 presses against the shoulder 25 and forces open the valve. But until the tappet allows the valve to be closed again, the spring pressure is not in any way supported by the valve stem; hence the stem is free to rotate so far as the spring is concerned.

The rotation of the stem is caused in the following manner; projecting downwardly from the upper spring bearing 30 is barrel 31 encircling the stem guide 17; this barrel has one or more slots 32 which are inclined to the stem and preferably spiral shaped. Lugs 33, fixed to the member 23, play in the respective slots; and as the barrel 31 is non-rotatably mounted on the guide 17, the member 27 is rotated a limited amount by the lugs when the member is forced upwardly by the collar 21; and the member 27 in turn rotates the collar 21, as it is snugly forced into the bore 22. The bore of the split collar is slightly larger than the reduced portion of the stem, and hence the collar as it rotates does not positively force the stem to rotate. By suitably forming the various parts of the rotator the stem may be caused to rotate as it rises or as it sinks, it being understood that when the cam 19 allows the collar 22 to be forced downwardly by the spring, the collar in turn forces downwardly the stem by means of the shoulder 26.

The rotation of the stem under these conditions depends upon the relative friction between the stem and the various elements in contact therewith. The friction between the guide 17 and the stem at all times opposes rotation of the stem; while the friction between the member 23 and the stem, at all times that 23 is rotating, tends to rotate the stem; and this tendency is in one direction as the stem rises, and in the opposite direction as the stem sinks, because it is to be understood that the member rotates, as it moves downwardly, due to the lugs 33 in the slots 32, in a direction opposite to its rotation when it moves upwardly. Also friction between the split collar and the shoulder 25 tends to rotate the stem in one direction when the stem moves upwardly, and friction between the collar and the shoulder 26 tends to rotate the stem in the opposite direction when it moves downwardly. Furthermore these rotating tendencies will be materially affected by the speed at which the cam 19 operates the valve stem longitudinally. The greater the longitudinal movement the less the tendency to rotate the stem. As a consequence, when the cam rotates in the direction indicated by the arrow the greater rotative tendency will be as the valve sinks, as it sinks more slowly than it rises. Also by making the surfaces of the upper end of the split collar and the shoulder 26 which are in contact as the stem sinks, rougher than the surfaces which are in contact when the stem rises there is a greater tendency to rotate as the valve closes.

Fig. 3 shows a modified form of split collar, in which the flanges 35 project inwardly from the ends 28 of the members of the collar, and cover the lower end of the valve stem. This makes a larger actuating surface on the collar and provides air cushioning means to prevent rattling, as the air in the bore of the collar must pass around the end of the stem before the stem is moved either up or down. If desired all loose play between the collar and the valve stem may be eliminated in order to reduce any rattling effect.

The elimination of the ball race from the device materially simplifies it and reduces the weight. Although there is a tendency for the relative movement of the ends of the spring and its bearings to wear the surfaces when the bearing 27 rotates, yet, if properly arranged, this relative movement may be eliminated. As the spring is compressed the coil ends tend to rotate relatively around the coil axis, and hence the coil tends to rotate the bearing 27, and if this effect is made in the same direction and equal to the rotating effect of the slots 32, there will be no relative movement of the coil end and its bearing. This is the effect when the coil is arranged as shown in the drawings.

I claim as my invention:

1. A valve in combination with a valve rotator, said rotator comprising a barrel encircling the valve stem, said barrel having a slot inclined to the axis of the barrel, a rotating member rotatably and slidably mounted in the bore of said barrel, a lug fixed to said member and projecting into said slot and so adapted to rotate said barrel and member relatively as they are moved relatively longitudinally, said member having a conical bore, a split collar mounted in said bore, and adapted to enclose the lower end of the valve stem, the end of said collar projecting below the end of said stem, and means for reciprocating said collar longitudinally of said stem.

2. A valve in combination with a valve rotator, said rotator comprising a fixed member having a bore and encircling said stem, a movable member mounted in said bore and encircling said stem, and having friction contact therewith, a spring bearing fixed to each of said members, a coil spring encircling said members with its end resting against the respective bearings, and tending to rotate said movable member as the spring is compressed, means arranged to rotate said movable member as it is moved longitudinally of the stem, said means arranged to rotate said movable member in the same direction as the rotating tendency of said spring, and means tending to move said movable member longitudinally, whereby friction between said movable member and said stem tends to rotate the stem.

3. A valve in combination with a valve rotator, said valve having a stem with opposing shoulders on its end, a collar mounted on said stem between said shoulders, and having a portion projecting below said stem end, means for reciprocating said collar longitudinally of said stem, and means for rotating said collar as it is moved longitudinally.

4. A valve in combination with a valve rotator, said valve having a stem with opposing shoulders on its end, a collar mounted on said stem between said shoulders, and having a portion projecting below said stem end, means for reciprocating said collar longitudinally of said stem, and means for rotating said collar as it is moved longitudinally, a portion of said means comprising a spring tending to force said collar against one of the said shoulders and to hold said valve closed.

5. A valve in combination with a valve rotator, said valve having a stem with a pair of opposing shoulders near its end, a split collar encircling said stem between said shoulders and having shoulders coacting with the respective stem shoulders when said collar is reciprocated, the collar having a portion projecting beyond the stem end, means for reciprocating said collar comprising a tappet for pressing against said projecting portion and a spring opposing said tappet pressure, and means for rotating said collar as it is reciprocated.

6. A valve in combination with a valve rotator, said valve having a stem with a pair of opposing shoulders near its end, a split collar encircling said stem between said shoulders and having shoulders coacting with the respective stem shoulders when said collar is reciprocated, the collar having a portion projecting beyond the stem end, means for reciprocating said collar comprising a tappet for pressing against said projecting portion and a spring opposing said tappet pressure, and means for rotating said collar as it is reciprocated, the friction tending to prevent relative rotation of one pair of coacting shoulders being greater than the friction tending to prevent relative rotation of the other pair of coacting shoulders.

7. A valve having a stem with a pair of opposing shoulders near one end, a split collar loosely mounted on said stem between said shoulders, the ends of said collar abutting against the respective shoulders as the collar is reciprocated, a member rotatively mounted on said stem and relatively immovably fixed to and encircling said collar, resilient means tending to force said collar in one direction, means for intermittently forcing said collar a limited distance in the opposite direction, and means for rotating said member as it moves longitudinally.

In testimony whereof, I hereunto set my hand.

MARCUS O. ANTHONY.